United States Patent
den Dunnen et al.

(10) Patent No.: US 8,623,929 B2
(45) Date of Patent: *Jan. 7, 2014

(54) METHOD AND EQUIPMENT FOR CONDITIONING LOW-METAL PLASTIC SCRAP

(75) Inventors: Bram den Dunnen, Braunschweig (DE); Michael Knust, Isenbuettel (DE); Heiner Guschall, Hilchenbach (DE)

(73) Assignees: Volkswagen AG, Wolfsburg (DE); Sicon GmbH, Hilchenbach (DE)

( * ) Notice: Subject to any disclaimer, the term of this patent is extended or adjusted under 35 U.S.C. 154(b) by 181 days.

This patent is subject to a terminal disclaimer.

(21) Appl. No.: 12/933,355

(22) PCT Filed: Mar. 18, 2008

(86) PCT No.: PCT/EP2008/002146
§ 371 (c)(1),
(2), (4) Date: Nov. 8, 2010

(87) PCT Pub. No.: WO2009/115096
PCT Pub. Date: Sep. 24, 2009

(65) Prior Publication Data
US 2011/0046248 A1 Feb. 24, 2011

(51) Int. Cl.
*C08J 11/04* (2006.01)
(52) U.S. Cl.
USPC ...... 521/40; 241/24.1; 241/24.13; 241/24.14; 241/24.15; 241/24.18; 241/29; 209/3; 209/12.1
(58) Field of Classification Search
USPC ......... 521/40; 241/20, 24.1, 24.12–24.18, 29; 209/3, 12.1
See application file for complete search history.

(56) References Cited

U.S. PATENT DOCUMENTS

| | | | |
|---|---|---|---|
| 3,010,749 | A | 11/1961 | Brissette et al. |
| 3,326,551 | A | 6/1967 | Clarke |
| 3,378,289 | A | 4/1968 | Beckman et al. |
| 3,738,483 | A | 6/1973 | MacKenzie |
| 4,026,678 | A | 5/1977 | Livingston |

(Continued)

FOREIGN PATENT DOCUMENTS

| | | |
|---|---|---|
| DE | 90 06 995 | 9/1990 |
| DE | 41 00 346 | 7/1992 |

(Continued)

OTHER PUBLICATIONS

Machine translation of DE19755629.*

(Continued)

*Primary Examiner* — Frances Tischler
(74) *Attorney, Agent, or Firm* — Kenyon & Kenyon LLP

(57) ABSTRACT

In a method and equipment for conditioning low-metal scrap high in plastics, which contains at least partially scrap high in plastics from shredder processes, especially of scrap vehicles, the method includes: splitting up ferromagnetic components from the scrap that is high in plastics; separating a first raw sand fraction from the scrap high in plastics that has been reduced in metals; reducing in size the fraction high in plastics that remains after the isolation of the first raw sand fraction; separating a second raw sand fraction after reducing in size the remaining fraction high in plastics; and splitting up the remaining fraction, that is high in plastics, into a light fraction and a heavy fraction.
The equipment has the appropriate device for carrying out the individual method steps.

11 Claims, 1 Drawing Sheet

(56) References Cited

U.S. PATENT DOCUMENTS

| | | |
|---|---|---|
| 4,242,197 A | 12/1980 | Voelskow et al. |
| 4,245,999 A | 1/1981 | Reiniger |
| 4,623,515 A | 11/1986 | Frei et al. |
| 4,874,134 A | 10/1989 | Wiens |
| 5,184,780 A | 2/1993 | Wiens |
| 5,522,554 A | 6/1996 | Blank et al. |
| 5,527,432 A | 6/1996 | Leuthold et al. |
| 5,908,165 A | 6/1999 | Guschall et al. |
| 6,070,733 A | 6/2000 | Osing |
| 6,086,000 A | 7/2000 | Murata |
| 6,361,091 B1 | 3/2002 | Weschler |
| 6,372,085 B1 | 4/2002 | Hsu et al. |
| 6,422,493 B1 | 7/2002 | Simon et al. |
| 6,974,097 B2 | 12/2005 | Simon et al. |
| 7,325,757 B2 | 2/2008 | Allen et al. |
| 8,267,336 B2 | 9/2012 | Goldmann et al. |
| 8,469,296 B2 * | 6/2013 | Knust et al. ............ 241/24.18 |
| 2004/0089102 A1 | 5/2004 | Goldmann et al. |
| 2004/0251335 A1 * | 12/2004 | Goldmann et al. ........ 241/24.13 |
| 2007/0158242 A1 | 7/2007 | Goldmann et al. |

FOREIGN PATENT DOCUMENTS

| | | |
|---|---|---|
| DE | 42 05 309 | 8/1993 |
| DE | 42 22 379 | 1/1994 |
| DE | 43 06 781 | 9/1994 |
| DE | 44 26 503 | 2/1996 |
| DE | 44 37 852 | 5/1996 |
| DE | 44 42 631 | 6/1996 |
| DE | 195 00 224 | 7/1996 |
| DE | 196 29 470 | 1/1998 |
| DE | 196 29 473 | 1/1998 |
| DE | 197 55 629 | 6/1999 |
| DE | 199 11 010 | 10/2000 |
| DE | 199 15 481 | 10/2000 |
| DE | 102 24 133 | 3/2003 |
| DE | 103 34 646 | 3/2005 |
| DE | 103 36 802 | 3/2005 |
| DE | 10 2004 045 821 | 3/2006 |
| EP | 0 418 194 | 3/1991 |
| EP | 0 479 293 | 4/1992 |
| EP | 0 623 390 | 11/1994 |
| EP | 0 884 107 | 12/1998 |
| EP | 1 020 225 | 7/2000 |
| EP | 1 332 001 | 8/2003 |
| EP | 1 333 931 | 8/2003 |
| EP | 1 337 341 | 8/2003 |
| EP | 1 721 676 | 11/2006 |
| JP | 2-229376 | 9/1990 |
| JP | 2-232487 | 9/1990 |
| WO | WO 98/01276 | 1/1998 |
| WO | 02/34400 | 5/2002 |

OTHER PUBLICATIONS

Office translation of Rudolph (DE 19755629).*
International Search Report and Written Opinion, PCT/EP2008/009909, dated Apr. 3, 2009.
International Search Report and Written Opinion, PCT/EP2009/001699, dated Jul. 21, 2009.
Search Report, German Patent Application No. 10 2008 016 417.8, dated Oct. 8, 2008.
Search Report, German Patent Application No. 10 2009 009 873.9, dated Nov. 24, 2009.
International Search Report and Written Opinion, PCT/EP2008/002146, dated Dec. 29, 2008.
International Search Report and Written Opinion, dated Jul. 21, 2009, issued in corresponding International Application No. PCT/EP2009/002103.
International Search Report and Written Opinion, dated Jul. 21, 2009, issued in corresponding International Application No. PCT/EP2009/002104.
German Search Report, dated Jun. 2, 2010, issued in corresponding German Patent Application No. 10 2008 026 416.4.
German Search Report, dated Jun. 2, 2010, issued in corresponding German Patent Application No. 10 2008 026 417.2.

* cited by examiner

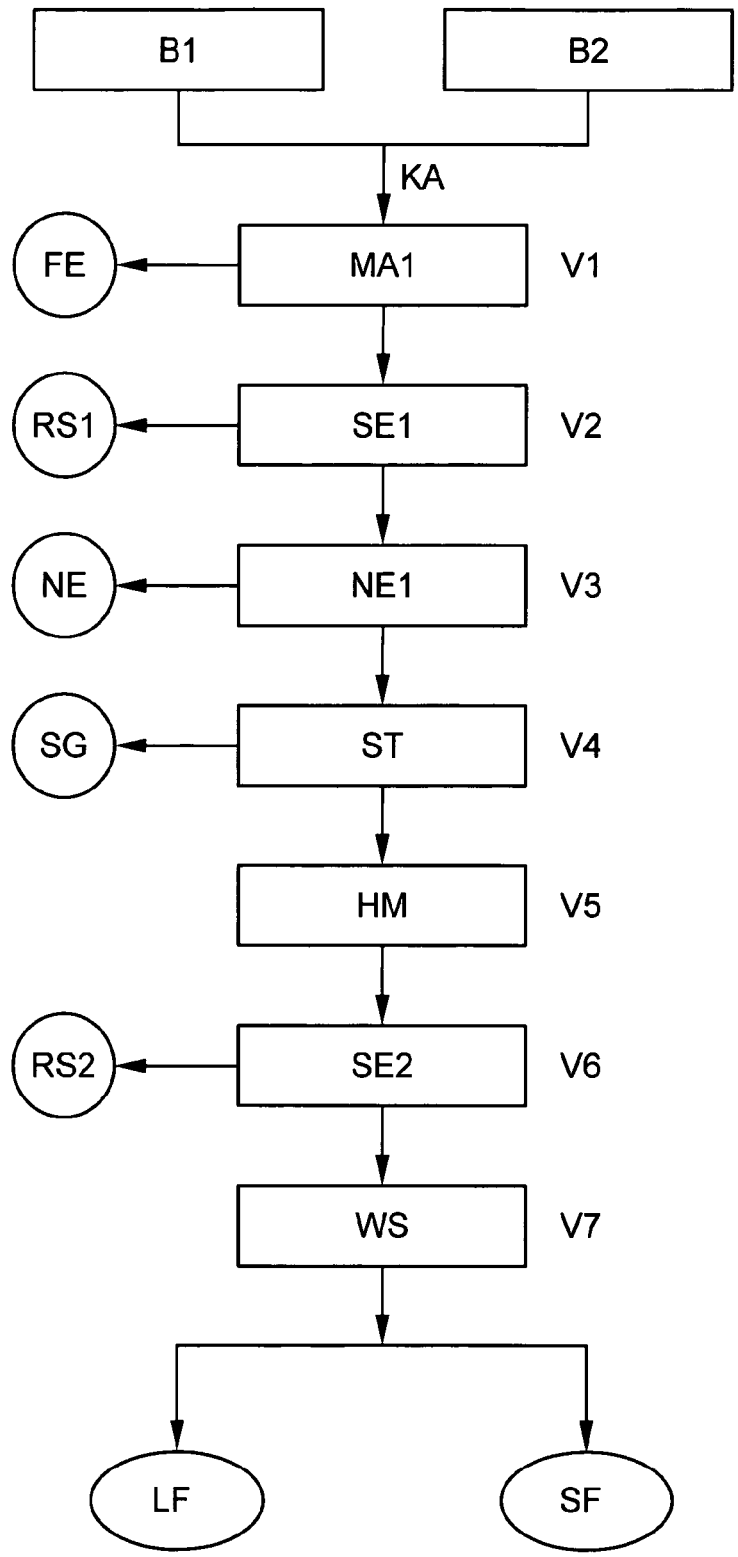

METHOD AND EQUIPMENT FOR CONDITIONING LOW-METAL PLASTIC SCRAP

FIELD OF THE INVENTION

The present invention relates to a method and equipment for conditioning plastic scrap that is low in metal, especially shredder residues of metal-containing scraps, especially of material mixtures that are low in metal but rich in plastic, which have been produced at least partially in vehicle shredder processes, in which the plastic scraps are separated at least into a light fraction (raw lint) and a heavy fraction (plastic-rich fraction).

BACKGROUND INFORMATION

A method for the conditioning of shredder residues is described, for example, in European Published Patent Application No. 1 332 001. In the method described therein, in separate preprocessings, conditioning of a light shredder fraction and conditioning of a heavy shredder fraction take place. During the preprocessing of the conditioning of the light shredder fraction, after isolating a foam fraction and, if necessary, a fiber fraction, there takes place a size reduction of the remaining fraction to form a discharge of <50 mm. A ferromagnetic fraction is separated from the reduced size fraction. The remaining non-ferromagnetic fraction is fed to a size reduction process, in which an additional breaking down of the material takes place. From the material that has been well broken down, a sand fraction of <4 mm is separated in a subsequent method step. The remaining fraction undergoes air sizing and density separation, and thus the fraction is separated into a light fraction of lint and a heavy fraction. The heavy shredder fraction is submitted to a separation of the ferromagnetic components. There follows a size classification of the residual flow and the segregation of the nonferrous metal-containing fraction. This may be accomplished in such a way that first a size classification takes place into greater than and less than 20 mm, and these fractions are separately fed to the metal separator. The main point, in this context, is that as clean a substance separation as possible takes place into a nonferrous metal-containing fraction and a remaining fraction that is low in metal. In a subsequent classification the separation of a sand fraction takes place having a grain diameter less than 6 mm. The remaining coarse grain fraction that is low in metal is subsequently separated into a heavy fraction and a highly dense residual fraction. In the subsequent main process, the heavy fractions from the two preprocessings are combined. These are first broken down in an additional size reduction step. After the size reduction, there is a density separation and the isolation of a light fraction consisting of plastic in a granulated form. The remaining heavy fraction is made up for the most part of nonferrous metals.

Furthermore, German Published Patent Application No. 103 34 646 describes a method and equipment for the conditioning of the light shredder fraction of the size reduction of scrap metals and metal-containing scraps, in which the light shredder fraction at its initial state goes through the processes of size reduction, size classification and air current sifting. In this context, the feed material is first exposed, within the scope of a selective size reduction, in such a way that the brittle mineral components, such as glass, ceramics, concrete and sand, in response to a subsequent screening, are discharged completely into fine material, and the remaining components, that are to the greatest extent irreducible in size using impact crushing, such as plastic, rubber, metals are discharged in coarser sizes. For the fine material, in this instance, piece sizes of <2 mm are specified, and for the non-reduced in size or irreducible components, piece sizes of 2-20 mm and >20 mm are specified.

German Published Patent Application No. 10 2004 045 821 describes a method and equipment for conditioning the light shredder fraction from the size reduction of scrap and metallic wastes, in which the material is first fed to loosening-up processes and drying processes. If in the feed material there are still safety-relevant massive components, thick-walled metal pieces and coarse stones present, these are separated with the aid of a heavy material selector. The light shredder fraction is subsequently submitted to a screening, whereby first a coarse material of >20 mm and an intermediate material of <20 mm is created. The intermediate product is fed to an additional screening, to isolate the fine material proportion (sand fraction) of <2 mm. Thereby, besides the sand fraction, a fraction is created having a piece size of 2-20 mm. Subsequently, using the fractions of the piece sizes of 2-20 mm and >20 mm airflow screening is carried out, using a multi-stage zigzag sifter, whereby, because of different air speeds in the individual sifting stages, two products made up of fibers, foamed plastic, foils and wood are created, one or two products made up above all of pieces of plastic and rubber are created, and a product is created that is rich in metal and containing the coarser mineral components.

Furthermore, German Published Patent Application No. 196 29 473 describes a method for conditioning a plastic mixture that is created by vehicle recycling. In a first method step, in this case, the ferromagnetic components are separated using a magnetic separator. After that, a coarse sifting at >10 mm is provided, after which the components having a grain size of >10 mm are submitted to a size reduction process, and are again fed to a coarse sifting. The components having a grain size of <10 mm are then submitted to a fine sifting at >2 mm, and thus a raw sand fraction of <2 mm is separated. In a further step, the remaining fraction is then submitted to a separation of light and heavy material.

SUMMARY

Example embodiments of the present invention provide a method and equipment by which low-metal plastics are able to be processed, and in the mechanical conditioning process, qualitatively high-value raw fractions are obtained, whereby in following refinement processes materially utilizable fractions are able to be produced.

In the method according to an example embodiment of the present invention, in which the low-metal plastic scrap is separated into a light fraction and a heavy fraction, the following method steps are carried out one after the other:
  separating ferromagnetic components from the scrap that is high in plastics,
  separating a first raw sand fraction,
  reducing in size the metal-reduced fraction high in plastics that remains after the isolation of the first raw sand fraction,
  separating a second raw sand fraction after reducing in size the remaining fraction high in plastics,
  splitting up the remaining fraction, that is high in plastics, into a light fraction and a heavy fraction.

Example embodiments of the present invention provide for the isolation of the first raw sand fraction after the separation of the ferromagnetic components from the scrap that is high in plastics, whereby a part of the components, that is not to be counted with the scrap high in plastics that is to be conditioned, is removed quite early from the scrap high in plastics, and thus only the components, that are separable in this method step, are submitted to the further process. That being the case, larger quantities of material that is actually still to be conditioned may be fed to the conditioning process. Furthermore, the costs of wear in the subsequent method steps are reduced.

The isolation of the first raw sand fraction may take place by sifting, especially by sifting using a size of hole in the range of 10-14 mm, e.g., in the range of 10-20 mm.

The isolation of the second raw sand fraction may also take place by sifting, but, e.g., by sifting using a size of hole in the range of 4-8 mm, especially a size of hole of 4-6 mm.

After the isolation of the first raw sand fraction, isolating non-ferromagnetic metal parts may be performed. It is thereby achieved that a large part of the non-ferromagnetic metal parts are separated, already at this conditioning stage, and not only when it comes to the subsequent refinement of the individual factions. In addition, for this reason the components are available again for utilization, in an earlier stage of the conditioning. The segregation of the metal parts may also be provided as a separation in stages, in the first stage there being once more a separation of ferromagnetic components, and in the second stage there being an isolation of the non-ferromagnetic metal parts. The isolation of the non-ferromagnetic metal parts may take place either via eddy current segregation or via an inductive metal separation.

After the isolation of the first sand fraction or perhaps after the separation of the non-ferromagnetic metal parts, a heavy material separation may be provided. During this process step, coarse and heavy parts are removed by air current isolation, for example, whereby the wear in the subsequent method steps is also reduced.

The splitting up of the remaining fraction high in plastics into the light fraction and the heavy fraction may take place using air sizing.

The reduction in size of the fraction high in plastics, that remains after isolating the first raw sand fraction, may be carried out such that the volume of the components of the light fraction, contained in the fraction high in plastics, is increased, whereby in the later method step of splitting up the plastics fraction into a light fraction and a heavy fraction, this separation is able to take place in a cleaner manner and using less effort.

The low-metal scrap to be conditioned, that is high in plastics, may have a metal proportion of <20%, e.g., approximately 5% of the overall quantity.

After performing the method, there is preferably created a light fraction high in plastics, having a bulk material weight of <0.2 t/m$^3$ on average, and a heavy fraction high in plastics, having a bulk material weight of >0.3 t/m$^3$.

The scrap high in plastics, that is to be conditioned, may be able to be, at least partially, shredder residues of metal-containing scrap, e.g., at least partially scrap high in plastic from vehicle shredder processes, and may contain particularly a light shredder fraction and/or a heavy shredder fraction.

The equipment for conditioning low-metal plastic scrap may have device arranged one after the other, using which, at least the following method steps are able to be carried out one after the other:

separating ferromagnetic components from the scrap that is high in plastics,
separating a first raw sand fraction,
reducing in size the scrap high in plastics that remains after the separation of the first raw sand fraction,
separating a second raw sand fraction after reducing in size the remaining plastics fraction,
splitting up the remaining fraction, that is high in plastics, into a light fraction and a heavy fraction.

Example embodiments of the present invention provide for the use of a device for the removal of the first raw sand fraction after the separation of the ferromagnetic components from the plastic scrap, whereby a part of the components, that is not to be counted with the plastics fraction that is to be conditioned, is removed quite early from the scrap high in plastics, and thus only the remaining components are submitted to the further process. That being the case, larger quantities of material, that is actually still to be conditioned, may be fed to the conditioning process. Furthermore, the costs of wear in the subsequent parts of the equipment are reduced.

A magnetic separator may be provided for separating the ferromagnetic components.

A sifting device may be provided for separating the first raw sand fraction, e.g., having a size of hole in the range of 10-14 mm, e.g., having a size of hole in the range of 10-12 mm.

For separating the second raw sand fraction, one may also use a sifting device, e.g., having a size of hole in the range of 4-8 mm, e.g., having a size of hole in the range of 4-6 mm.

A device for separating non-ferromagnetic metal parts (metal fraction) may be postconnected to the device for separating the first raw sand fraction. As the device for separating the non-ferromagnetic metal fraction, one may use a device for eddy current segregation or a device for inductive metal separation based on the electrical conductivity of the components.

Because of the isolation of the non-ferromagnetic metal fraction provided at this point, it is achieved that, already at this conditioning stage, a large part of the non-ferromagnetic metal parts is separated, and not only in response to the subsequent refinement of the individual fractions. In addition, for this reason, the components are available again for utilization, in an earlier stage of the conditioning.

As the device for sensitive metal separation one may use, for example, a metal separator that works inductively based on the electrical conductivity of the components.

A device for isolating heavy material, e.g., using air currents for separating heavy material, may be provided to the device for separating the first raw sand fraction or, provided it is present, to the device for separating non-ferromagnetic metal fractions. Because of the isolation of coarse components, the wear of the subsequent parts of the equipment is able to be reduced.

The device for splitting up the remaining fraction, that is high in plastics, into a light fraction and a heavy fraction may include an air sifting device.

Furthermore, it may be provided that the device for reducing in size of the fraction remaining after the isolation of the first raw sand fraction is arranged such that the volume of the components of the light fraction, included in the fraction that is high in plastics, may be increased, whereby the subsequent splitting up of the fraction high in plastics into a light fraction and a heavy fraction may be done in a cleaner manner and using less effort.

Example embodiments of the present invention are described in greater detail below.

BRIEF DESCRIPTION OF THE DRAWING

The FIGURE is a schematic view of a flowchart illustrating the method of an example embodiment of the present invention.

DETAILED DESCRIPTION

The FIGURE shows a schematic flowchart of the successive process steps, for obtaining a light fraction (raw lint) LF that is high in plastics and a heavy fraction (raw granulate) SF that is high in plastics, which may be postconnected, for instance, to a shredder process of scrap vehicles. Besides low-metal scrap high in plastics from a shredder process, other scrap high in plastics may also be conditioned with the aid of the method and equipment described herein. In the exploitation of scrap vehicles, metal-containing scrap is initially broken down by a shredder in a, e.g., conventional, preconnected shredding process, by a size reduction process. A light shredder fraction SLF capable of flying is subsequently separated off by a suction device. The heavy material stream, which remains after the suction and is not capable of flying, is separated on a magnetic separator, into a ferromagnetic and a non-ferromagnetic fraction. The ferromagnetic fraction is designated as shredder scrap, and represents the primary shredder product, which may be used directly in metallurgy. The remaining heavy non-ferromagnetic fraction is designated as heavy shredder fraction SSF.

One other possibility of a shredder process is that, in a shredder process, the metal-containing scrap is broken down by size reduction, and subsequently a separation takes place of a metal-containing fraction or fractions and a low-metal fraction high in plastics.

The light shredder fraction SLF is conditioned further, according to example embodiments of the present invention, by itself or together with the heavy shredder fraction SSF and perhaps with additional low-metal plastic scraps, and are designated as low-metal, high plastic scrap KA, when they are submitted to the process hereof. These high-plastic scraps have a metal proportion of <20%, e.g., a metal proportion of the order of magnitude of 5%.

One or more feed containers B1 and/or B2 are provided for the incoming supply of the low-metal, high-plastics scraps, in order to decouple the conditioning process from upstream processes such as the shredder process.

In a first method step V1, the ferromagnetic components FE are separated, using a magnetic separator MA1, as a ferromagnetic fraction, which may then be fed to a metallurgical processing process, for the material reutilization. There then follows separation V2 of a first raw sand fraction RS1, using a sifting device SE1, which has a size of hole in the range of, e.g., 10-12 mm. Because of the separation of this raw sand fraction, the subsequent process steps are relieved with respect to the separated raw sand fraction. After method step V2 there is a process step "segregation of non-ferromagnetic metal components" (non-ferromagnetic metal fraction), such as copper, brass and aluminum. At this point, one may use device NE1 for eddy current segregation or for sensitive metal isolation using color detection or off color detection. The equipment VARISORT of the firm S & S, GmbH may be utilized in this instance. Subsequent process step V4 of the separation of coarse components substantially reduces the wear in the next process step V5 of the main size reduction. In process step V4, for separating coarse components SG, device ST for air current separation, so-called air knife systems, may be used. After the isolation of the heavy material, in process step V5, a size reduction of the remaining fractions takes place, using a hammer mill MH. The size reduction takes place, in this instance, in that the volume of the light fraction (raw lint) LF contained in the remaining fractions is increased, whereby in a later process step V7 an improved and purer fraction separation of the remaining fractions into a light fraction (raw lint) LF and a heavy fraction (raw granulate) SF is made possible. According to exemplary embodiments, a device (WS) for air sifting is provided for splitting up the remaining fraction. Between process step V5 of size reduction, e.g., at 30 mm, especially at 20 mm, and process step V7 of separating the remaining fractions, a process step V6 is provided, in which a second raw sand fraction RS2 is separated using a sifting device SE2. The size of hole of sifting device SE2 is in a range of, e.g., 4-6 mm.

With the aid of the method and the equipment described herein, the end products obtained are a raw lint fraction LF, which, on average, has a bulk material weight of <0.2 t/m$^3$, and a raw granulate fraction SF which, on average, has a bulk material weight of >0.3 t/m$^3$, which after refinement may be supplied to material utilization.

LIST OF REFERENCE CHARACTERS

SSF heavy shredder fraction
SLF light shredder fraction
LF light fraction (raw lint)
SF heavy fraction (raw granulate)
KA low-metal scrap high in plastics
B1, B2 feed container
V1-V7 process steps
MA1 magnetic separator
RS1 first raw sand fraction
SE1 first sifting device
NE1 device for separating non-ferromagnetic metal parts
ST air current separation device
MH hammer mill
RS2 second raw sand fraction
SE2 sifting device
FE ferromagnetic components
NE non-ferromagnetic metal parts
ST device for separating heavy material
SG heavy material
FE ferromagnetic components
WS device for splitting up into a light fraction and a heavy fraction

What is claimed is:

1. A method for conditioning low-metal scrap high in plastics, in which the scrap high in plastics is separated into at least one light fraction and at least one heavy fraction, comprising, in the following order:
    separating ferromagnetic components from the scrap that is high in plastics;
    separating a first raw sand fraction from the scrap high in plastics that has been reduced in metals;
    separating non-ferromagnetic metal components from the fraction high in plastics;
    reducing in size the metal-reduced fraction high in plastics that remains after the separation of the first raw sand fraction;
    separating a second raw sand fraction after the reducing in size of the remaining fraction high in plastics; and
    splitting up the remaining fraction high in plastics into the light fraction and the heavy fraction.

2. The method according to claim 1, wherein the separation of the first raw sand fraction from the metal-reduced scrap high in plastics includes at least one of (a) sifting, (b) sifting using a hole size in the range of 10 to 14 mm, and (c) sifting using a hole size in the range of 10 to 12 mm.

3. The method according to claim 1, wherein the separation of the second raw sand fraction includes at least one of (a) sifting, (b) sifting using a hole size in the range of 4 to 8 mm, and (c) sifting using a hole size in the range of 4 to 6 mm.

4. The method according to claim 1 further comprising, after the isolation of the non-ferromagnetic metal components, performing a heavy material separation process.

5. The method according to claim 1, further comprising, after the separation of the first raw sand fraction, performing a heavy material separation process.

6. The method according to claim 1, wherein the splitting up includes splitting up the remaining fraction high in plastics into the light fraction and the heavy fraction by air sifting.

7. The method according to claim 1, wherein the reduction in size of the fraction high in plastics remaining after the separation of the first raw sand fraction includes increasing a volume of components of the light fraction contained in the fraction high in plastics.

8. The method according to claim 1, wherein the low-metal scrap high in plastics includes a metal proportion of at least one of (a) less than 20% and (b) approximately 5% of an overall quantity.

9. The method according to claim 1, wherein the light fraction on average has a bulk material weight of less than approximately $0.2$ t/m$^3$ and the heavy fraction on average has a bulk material weight of greater than approximately $0.3$ t/m$^3$.

10. The method according to claim 1, wherein the low-metal scrap high in plastics includes shredder residues of metal-containing material flows.

11. The method according to claim 1, wherein the low-metal scrap high in plastics includes at least one of (a) low-metal plastic scrap produced at least partially in vehicle shredder processes, (b) a light shredder fraction, and (c) a heavy shredder fraction.

\* \* \* \* \*

UNITED STATES PATENT AND TRADEMARK OFFICE
CERTIFICATE OF CORRECTION

PATENT NO. : 8,623,929 B2  Page 1 of 1
APPLICATION NO. : 12/933355
DATED : January 7, 2014
INVENTOR(S) : den Dunnen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this
Twenty-second Day of September, 2015

Michelle K. Lee
*Director of the United States Patent and Trademark Office*